(No Model.)
W. N. PARRISH.
WIRE FENCE MACHINE.
No. 511,059. Patented Dec. 19, 1893.
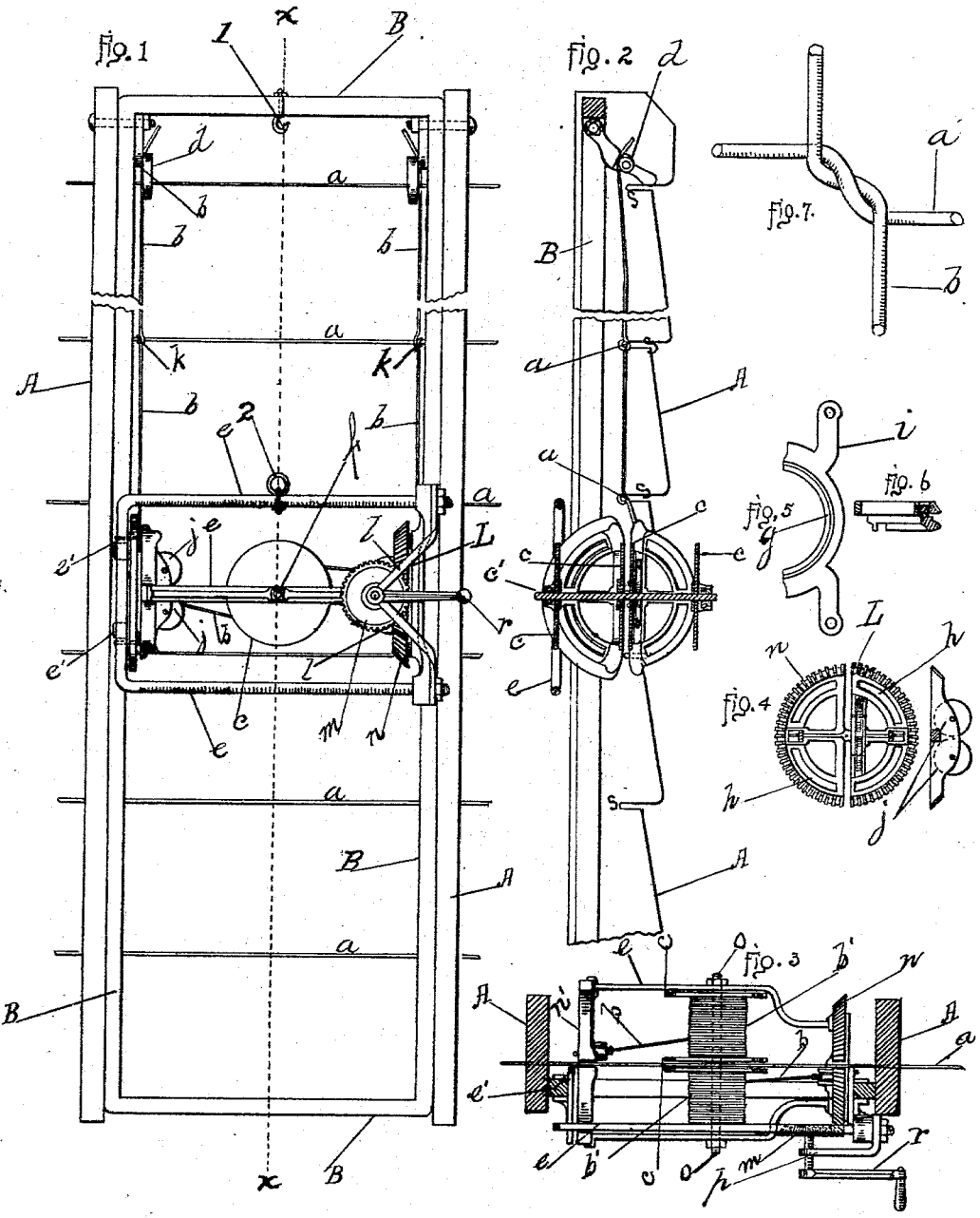
Witnesses.
C C Bell
M E Swain
Inventor.
William N Parrish
by W J Dennis
Attorney

UNITED STATES PATENT OFFICE.

WILLIAM N. PARRISH, OF RICHMOND, INDIANA.

WIRE-FENCE MACHINE.

SPECIFICATION forming part of Letters Patent No. 511,059, dated December 19, 1893.

Application filed August 28, 1893. Serial No. 484,188. (No model.)

*To all whom it may concern:*

Be it known that I, WILLIAM N. PARRISH, a citizen of the United States, residing at Richmond, in the county of Wayne and State of Indiana, have invented certain new and useful Improvements in Fence-Machines; and I do hereby declare the following to be a full, clear, and exact description of the invention, such as will enable others skilled in the art to which it appertains to make and use the same.

My invention relates to that class of machines used for making wire fencing where wires of different sizes are used and meshes of different dimensions are desired.

My invention consists in a rectangular frame the height of which is greater than its width and in which a spool frame with the spools carrying wires is arranged to travel up and down said rectangular frame being adapted to be moved laterally on horizontal wires which when secured to posts form the longitudinal portion of the fence—the spool frame which carries wire being made to revolve around each of the horizontal wires in succession as it passes downward making one and one half revolutions around each. The spools are provided with a tension device by which the wire thereon is drawn closely around the horizontal wires thus causing a tight fit of the vertical wire and forming a rectangular mesh, the sides of which are composed of the wires from the spools and the top and bottom of which are the horizontal fixed wires.

In the drawings Figure 1 is a front elevation of my machine. Fig. 2 is a side elevation of the frame and shows a vertical cross section of the spool frame and spools and of the horizontal wires with the vertical wire looped around them said section being taken on the line $x\,x$ of Fig. 1. Fig. 3 is a top plan view of the spool frame showing the framing of the machine in cross section and showing the guides upon which the spool frame traverses up and down. Fig. 4 is an elevation of the circular head of the spool frame showing a bevel gear on its inner face at its periphery and the friction rollers between which the vertical wires pass as they are fed from the spool and the open space central one way of its diameter which receives the horizontal wire while the spool frame revolves around it. Fig. 5 is a front elevation of a bracket which is secured to the inside surface of the frame of the machine and which is provided with an annular rib which fits into a corresponding recess in the circular head of the spool frame thus forming the journal bearing upon which the spool frame revolves. Fig. 6 is a horizontal cross section of the machine frame. Fig. 7 is a view of the form of twist or cable that is produced by the contact of horizontal and vertical wires when said wires are nearly of the same size and resistance.

In Fig. 1, A A represent the side casing composed of wood, and B B an iron frame rectangular in form to which the side casing A A is attached, the whole forming the frame of the machine.

$e\,e$ represent the side bars of a spool frame the ends of which are provided with ears $e'\,e'$ which act as guides holding the spool frame in contact with the frame B B upon which it is arranged to move up and down. This spool frame is constructed to revolve horizontally inside the iron frame by means of an annular rib $g$ Fig. 5 which is part of a bracket $i$ secured to the inner surface of the frame and which fits into an annular recess $h$ in the circular head of the spool frame the rib $g$ and recess $h$ forming the journal bearing upon which the spool frame is permitted to revolve. The circular head plate of the spool frame Figs. 4 and 1 has a bevel gear $n$ on the inner surface of its periphery Fig. 3 which engages a bevel pinion $m$ Figs. 3 and 1 said pinion $m$ being operated on its axis $p$ which has its bearing in the side bar $e$ of the spool frame and is operated by the crank $r$. Within the body of the circular head plate L is placed a pair of friction pulleys $j\,j$ Figs. 4 and 1 between which the wire $b$ from the spools $c\,c$ passes as it is paid off of the spools and taken up in operating the machine.

The spools $c\,c$ on which the wires $b\,b$ are wound as shown at $b'\,b'$ Fig. 3, have a common axle $c'$ the end bearings of which are in the side pieces $e\,e$ as seen at $f$ Fig. 1 each end of which is provided with a screw nut the screwing up of which creates a pressure of contact between the side bars $e\,e$ and the face of the flange which forms the end of the spool thus acting as an obstruction to the revolving of the spool and creating a tension which is regulated by said screw nuts o o.

At k k Fig. 1 the wire b is shown as wrapped around the wire a, which is done by one and one half revolutions of the spool which is accomplished by three revolutions of the crank r the pinion m being so proportioned as to require two revolutions of the pinion m for one revolution of the circular head plate n of the spool frame so that each loop k k is made by bringing the spool frame down so that the open space in the circular head plate n embraces the wire a which also passes between the inner flanges of the spools and in this position the spool frame is revolved one and one half times which forms the loop on the wire a and leaves the circular head plate with the space open below its axis and allowing the spool frame to be pushed down upon the next succeeding wire a of the series. The arms or braces l l are supports for the shaft p of the bevel pinion m.

The side casing A A of the frame is provided with horizontal recesses s which receive and retain in position the wires a which are being wrapped by the vertical wires b, said recesses being arranged at such distances from each other as to accommodate the positions assigned to the horizontal wires a in the construction of the fence. These recesses may be closed with a latch or otherwise so as to hold the framing to the horizontal during the operation of the machine. The circular head plate n' of the spool frame at the end of the frame opposite the bevel gear is similar in construction excepting the gear and is provided with friction pulleys j j in a similar manner.

Friction clutches d d Fig. 1 are fixed to the upper end of the framing for the purpose of receiving and holding the ends of the vertical wires b b while the first wrap is made on wire a and to sustain the weight and strain of the spool frame and the pressure on it as it is forced down from wire to wire and upon reaching the bottom wire a the vertical wires b b are cut and the machine moved laterally the recess s of the framing A A resting on the wires a a which serve to hold the framing in position ready for use when so moved. The spool frame is then elevated to its initial position the ends of the vertical wires again fixed in the clutches d d and the operation is repeated. It will be seen that the guides or ears are placed on one side of the axis of the spool frame so that the orbit of the revolution of the spool frame is eccentric to its axis. b' b' Fig. 3 show the wire coiled upon the spool preparatory to being used.

The distance between the vertical wires b b may be regulated by the length of the spool frame and the width of the meshes vertically in those following the last one in position by regulating the locality of the framing upon the wires a a a.

In Fig. 1 a ring 2 is secured to the top bar of the spool frame which is intended to engage the hook 1 at the top of the iron frame B forming a means of holding the spool frame in position while the wires b b are being adjusted on the clutch d or while the machine is being moved.

Having thus fully described my invention, what I claim as new, and desire to secure by Letters Patent, is—

1. In a fence machine, a movable frame composed of the parts A A and B B arranged to permit a spool frame e e to traverse its sides carrying spools upon which wires b b are coiled, said spool frame adapted to revolve on the rib g working in the recess h, in the manner and for the purpose as herein described.

2. In a spool frame for a fence machine, the circular head plate provided with recesses h h, bevel gear n, friction pulleys j j, and a slotted opening from center to circumference one way of its diameter, as herein set forth.

In testimony whereof I affix my signature in presence of two witnesses.

WILLIAM N. PARRISH.

Witnesses:
CHARLES F. PEELLE,
W. T. DENNIS.